Figure 1:
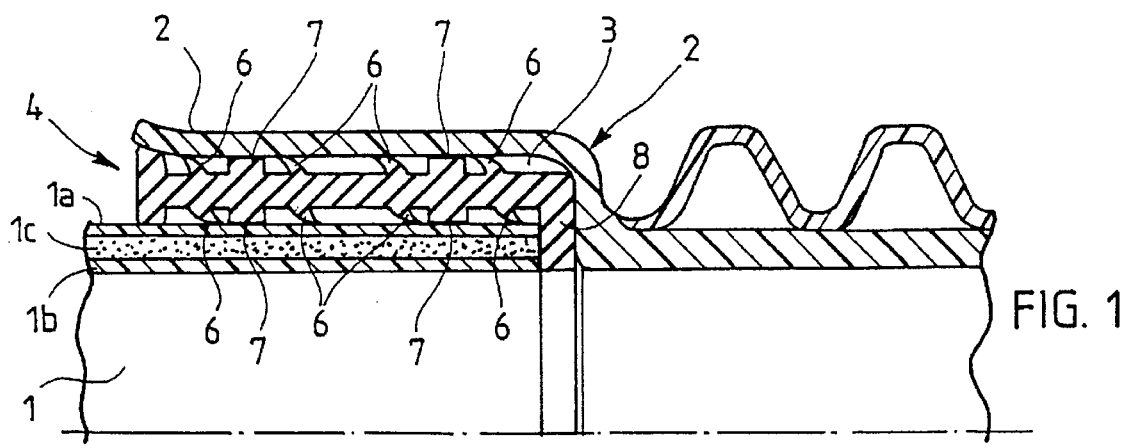

United States Patent

Järvenkylä

[11] Patent Number: 5,653,452
[45] Date of Patent: Aug. 5, 1997

[54] SOCKET JOINT FOR PLASTIC PIPES

[75] Inventor: Jyri Järvenkylä, Hollola, Finland

[73] Assignee: Uponor B.V., Amsterdam, Netherlands

[21] Appl. No.: 641,481

[22] Filed: May 1, 1996

[30] Foreign Application Priority Data

May 16, 1995 [FI] Finland .................. 952378

[51] Int. Cl.⁶ .................. F16L 17/025
[52] U.S. Cl. .................. 277/207 A; 277/209; 285/110; 285/345; 285/374; 285/423; 285/910
[58] Field of Search .................. 285/110, 231, 285/345, 374, 423, 910; 277/207 A, 209, 210, 211

[56] References Cited

U.S. PATENT DOCUMENTS

| 2,841,429 | 7/1958 | McCuistion | 277/209 |
| 3,052,478 | 9/1962 | Horvereid | 277/209 |
| 4,293,138 | 10/1981 | Swantee | 285/110 X |

FOREIGN PATENT DOCUMENTS

| 278085 | 3/1965 | Australia | 277/207 A |
| 192597 | 8/1986 | European Pat. Off. | 285/110 |
| 0386516 | 9/1990 | European Pat. Off. | |
| 0598331 | 5/1994 | European Pat. Off. | |
| 0686799 | 12/1995 | European Pat. Off. | |
| 2234508 | 1/1975 | France | |
| 1475807 | 9/1969 | Germany | 285/110 |
| 1944832 | 3/1971 | Germany | |
| 2350265 | 5/1974 | Germany | |
| 2800406 | 7/1979 | Germany | |
| 8801130 | 11/1989 | Netherlands | 285/110 |
| 81/03535 | 12/1961 | WIPO | |

*Primary Examiner*—Dave W. Arola
*Attorney, Agent, or Firm*—Ladas & Parry

[57] ABSTRACT

The invention relates to a socket joint for plastic pipes, whereupon a spigot end (1a) of one (1) of the pipes to be connected is inserted in an expanded section (2a) of a socket (2), and an intermediate space (3) situated between the spigot end and the expanded section comprises a housing sealing unit (4) that extends along a considerable part of the length of said intermediate space and that comprises several circular flexible lip seals (6) on its outer and inner circumference. The outer and inner circumference of the sealing unit (4) also comprise several circular support seals (7) which have a substantially smaller compressibility especially in the radial direction than the lip seals (6).

16 Claims, 2 Drawing Sheets

SOCKET JOINT FOR PLASTIC PIPES

The invention relates to a socket joint for plastic pipes, whereupon a spigot end of one of the pipes to be connected is inserted in an expanded section of a socket, and an intermediate space situated between the spigot end and the expanded section comprises a housing sealing unit that extends along a considerable part of the length of said intermediate space and that comprises several circular flexible lip seals on its outer and inner circumference.

In a previously known socket joint for plastic pipes, a smooth plastic pipe is connected to a socket having an inner circumference with a recess comprising an O-ring seal of a circular cross-section, as disclosed for example in Finnish patent 66069. This simple manner of implementation is applicable for pipes subjected to great radial stresses only in cases where the ring rigidity of the pipe to be joined to the socket is sufficiently great. The spigot end of the pipe should be able to stand the surface pressure caused by a hard O-ring without being deformed.

In another known socket joint, a socket with a smooth inner surface encircles a ribbed pipe having a great ring rigidity characteristic of this type of pipes. The sealing is realized with one or several O-ring seals that are placed between the ribs. An example of this manner of joining is disclosed in DE-UM-86 19 356. The significant feature is typically a substantially higher profile height than in a smooth pipe having a corresponding ring rigidity.

Since the most costly element in piping systems is usually the pipe fittings, it would be preferable if pipes of several different types could be joined to the same pipe fitting or socket. However, there are problems related to using a socket intended for a certain type of pipe for joining a pipe of another type.

If the outer diameter of a ribbed pipe corresponds to the diameter of a smooth plastic pipe, the ribbed pipe can be joined to the socket of the smooth plastic pipe if the rubber seal of the socket is removed. The only problem with this joint is the threshold formed between the inner diameters due to the different profile heights.

Problems occur especially when a smooth pipe should be joined to a socket intended for ribbed pipes. It is naturally possible to provide the socket of a ribbed pipe with a conventional sealing groove, but in such a case the inner diameter of the pipe fitting will be substantially smaller than the inner diameter of the pipe, causing thus problems at least in gravity flow in an underground sewage and drainage pipe.

These problems are marked especially when the pipe to be joined is a smooth multilayer pipe which comprises considerably softer foamed material between the inner and outer layers, whereupon the wall thickness of the pipe is greater than normally and the inner layer maintains its shape best when subjected to lateral stresses but the outer layer and the material situated in the middle is deformed more easily.

When such a pipe is joined to a conventional socket, it produces a threshold since the wall thickness and therefore the inner hole in conventional pipe fittings are designed according to homogenous material, i.e. they are thinner than in the foamed pipe. On the other hand, a joint with a ribbed pipe comprising an additional groove for a rubber ring, as disclosed in European patent 600 214, is also problematic since the profile height is not sufficient, i.e. there will be a threshold in the inner hole, but also because the O-ring would make the thin surface layer yield, thus leading to a decrease in the surface pressure and therefore to a risk of leakage in the long run.

German Utility Model 92 15 544.8 discloses a simple solid seal intended to be placed between a smooth pipe and a smooth inner surface of a socket. This seal is not applicable for the above-described purposes especially in pipe systems that are situated underground in the horizontal direction and that are subjected to great local radial stresses (caused by stones, for example), since the sealing effect of the seal is not sufficient under deformations. Solid seals are also problematic due to the extremely great insertion force they require. Since the axial strength in pipes with a light construction is about one third of the strength of a corresponding homogenous pipe, a great insertion force may cause the pipe to break when it is being forcibly inserted.

Such a socket sealing device is also known that is positioned between the above-described smooth surfaces and that comprises an elongated housing the inner and outer circumference of which contain several circular flexible lip seals that are made of the same flexible material as the housing frame. This sealing device is intended for uses with no significant radial or lateral stresses, for example for vertical pipelines of buildings. If this sealing device is used in underground horizontal pipelines, it compresses too much radially thus resulting in a side compression, whereupon the pipe to be joined is situated considerably off the centre in the socket, causing problems both for the sealing and for the evenness of the flow.

The purpose of the present invention is to avoid the above-described problems and to provide such a sealing in the socket joint concerned that a socket with a relatively light construction intended especially for ribbed pipes could also be used for joining light-construction pipes with a smooth surface without problems and additional costs.

This objective is achieved with a socket joint of the type mentioned at the beginning, characterized according to the invention in that the outer and inner circumference of the sealing unit also comprise several circular support seals which have a substantially smaller compressibility especially in the radial direction than the lip seals, and that the sealing unit with its seals is one integral piece.

The invention is based on the idea that in addition to lip seals, the sealing device is also provided with more solid seals the primary function of which is to prevent the seal from compressing too much, whereas the lip seals perform the actual sealing.

The primary advantage of the invention is that the field of use of light-construction, inexpensive socket joints that are actually intended for the joints of ribbed pipes can be considerably expanded, whereupon it is not necessary to separately design sockets, but only a new sealing unit, for the simple multilayer pipes that contain recycled plastic and that are used more and more at present.

Figure 2:
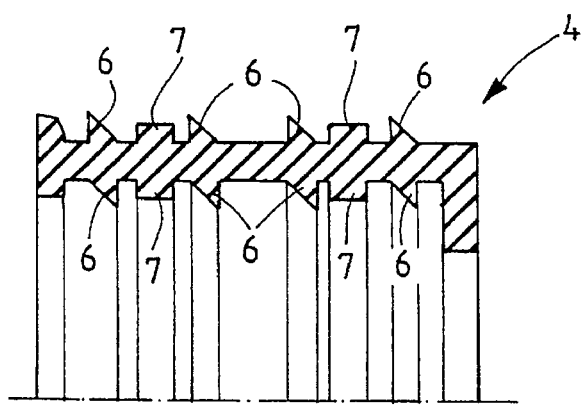
Figure 5:
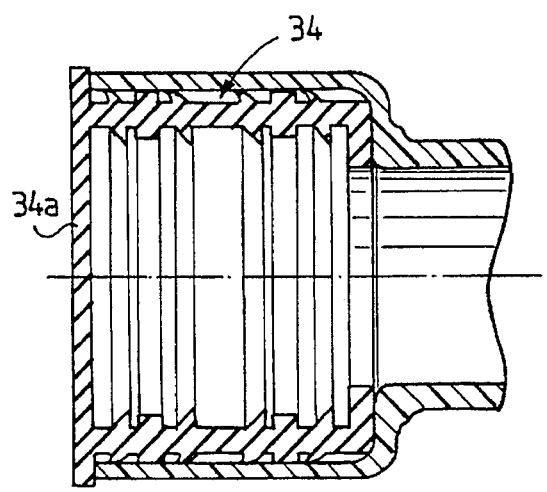
Figure 6:
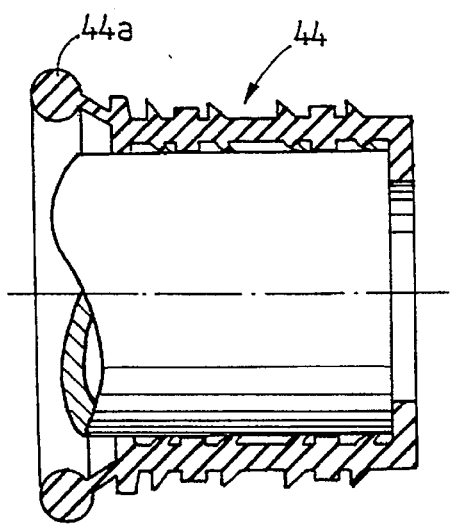
Figure 7:
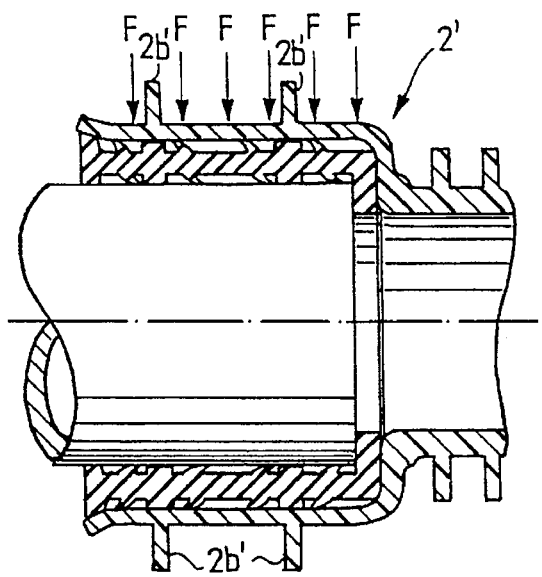
Figure 8:
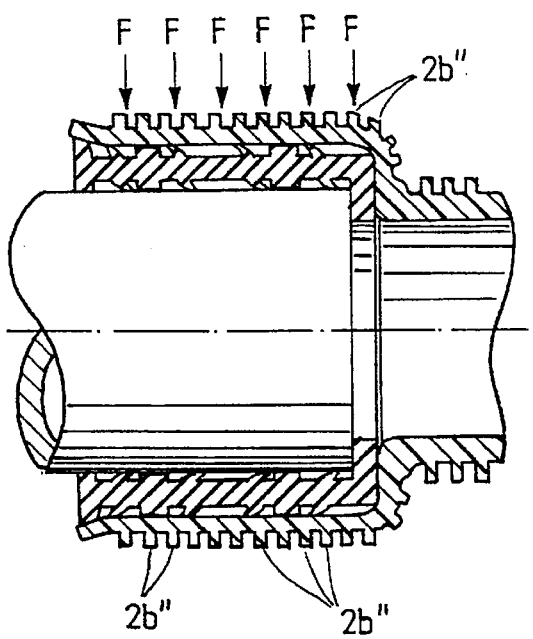

In the following, the invention will be described in greater detail with reference to the accompanying drawing, in which FIG. 1 is a cross-section of a socket joint according to the invention, FIG. 2 shows separately the seal of FIG. 1, FIGS. 3 to 6 show alternative embodiments of the sealing unit, and FIGS. 7 and 8 show a situation wherein the socket joint according to the invention is subjected to a radial stress.

FIG. 1 is a cross-section of a socket joint according to the invention for plastic pipes, in which joint a spigot end 1a of one 1 of the pipes to be connected is inserted in an expanded section 2a of the socket 2, and an intermediate space 3 situated between the spigot end 1a and the expanded section comprises a tubular housing sealing unit 4 extending along a considerable length, essentially the entire length, of the aforementioned intermediate space 3. The socket 2 may be situated either in a separate connecting piece or it may be formed in the other pipe to be joined with the pipe 1. One end of the sealing unit 4 has a portion 8 that extends radially inward of lip seals 6 and support seals 7 on a radially inner surface of the tubular housing body.

The sealing unit 4, which is shown most clearly in FIG. 2, comprises a cylindrical frame section 5 the outer and inner circumference of which comprise several circular flexible lip seals 6 and several circular support seals 7 having substantially smaller compressibility especially in the radial direction than the lip seals 6. The actual sealing is primarily performed by the lip seals 6, whereas the main function of the support seals 7 is to prevent the lip seals 6 from compressing too much.

When the sealing unit 4 is of the type described above, the pipe 1 to be connected may be a multilayer pipe comprising, between an outer and inner casing 1a and 1b made of harder plastic, a considerably softer foamed plastic material 1c, and the socket 2 may be a conventional light-construction socket intended for ribbed pipes without the occurrence of any of the above-described sealing problems or side compressions with the problems of eccentricity. The pipe 1 to be connected may be for example a recycled STIS 8 pipe formed of polyethylene and the socket 2 may be made of polyvinyl chloride.

In the embodiment of FIGS. 1 and 2, both the lip and support seals 6 and 7 are situated preferably evenly spaced apart and the support seals 7 are positioned between every other lip seal 6. Further, the lip and support seals 6 and 7 positioned on the outer circumference are placed to substantially match the lip and support seals 6 and 7 provided on the inner circumference of the sealing unit.

In the embodiment concerned, the cross-section of the support seals 7 is substantially rectangular, whereas the lip seals 6 have a fin-like shape so that their cross-section tapers off sharply ending in a sharp tip. Further, the support seals 7 are lower than the lip seals 6 and their cross-sectional surface is greater than that of the lip seals. It is also preferable that the support seals 7 are harder than the lip seals 6. Thus, when the hardness of the support seal 7 increases, its cross-sectional surface can be reduced, if necessary.

The material of the sealing unit 4 may be for example thermoplastic rubber. However, the support seals 7 and the lip seals 6 may also be made of different materials. The material may also be thermoplastic elastomer that can be extruded.

The end of the above-described sealing unit 4 situated further in the socket 2 also comprises a radially inwardly directed annular flange 8 the inner diameter of which corresponds substantially to the inner diameter of the pipe 1 to be connected, the flange keeping the sealing unit in place at the spigot end 1a of the pipe 1 to be connected during the insertion into the socket 2.

FIGS. 3 to 6 show, only by way of example, some of the several alternative embodiments of the sealing unit of the socket joint according to the invention.

Figure 3:
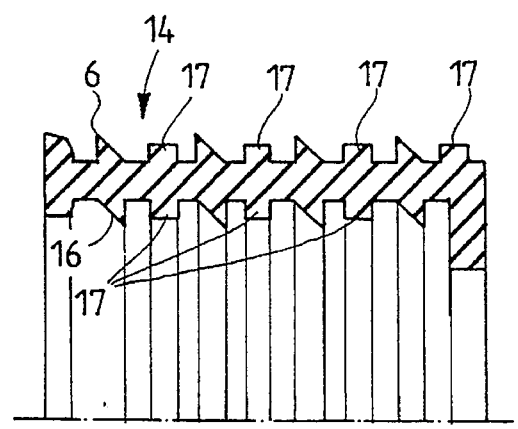

In the sealing unit 14 of FIG. 3, the support seals 17 are positioned between every lip seal 6 and they are formed to be less solid than in the first embodiment.

Figure 4:
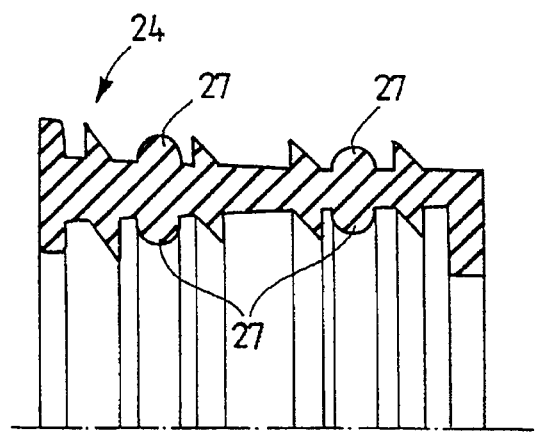

In the sealing unit 24 of FIG. 4 in turn, the shape of the support seals 27 differs from the above-described examples and approximates to a semi-circle. The sealing unit can also be made slightly conical, as shown in FIG. 4, which provides the advantage that the spigot end of the pipe to be inserted in the socket is easy to install at the beginning since the insertion force increases only gradually after the holding friction has already been overcome.

The sealing unit may also be similar to the sealing unit 34 of FIG. 5, which extends to the outside of the socket and blocks the socket with its end section 34a. The end section 34a can be removed when a connecting pipe is placed in the socket.

The sealing unit may also be similar to the sealing unit 44 of FIG. 6 comprising additional fittings. The end of the sealing unit comprises grip handles, a grip ring 44a or the like with which the sealing unit can be easily pulled over the spigot end of the pipe.

All the above-described sealing units are integral pieces, also in cases where the support and lip seals are made of different materials.

FIG. 7 in turn illustrates a situation wherein all the other parts of the socket joint of FIG. 1, except the outer surface of the socket, are subjected to a great radial stress F, whereupon the socket joint retains its sealing capacity, however, due to the sealing arrangement according to the invention and keeps the pieces to be joined substantially coaxial. This figure shows that the sealing unit 4 is preferably formed in such a way that the hard support seals 7 are positioned in places where the outer surface of the socket 2' concerned comprises for example ribs 2b' that strengthen the structure.

FIG. 8 corresponds to FIG. 7, except that in FIG. 8 the ribs 2b" are smaller and they are positioned more densely than in FIG. 7.

It is clear for a person skilled in the art that the invention is not restricted to the above-described examples, but the details of the invention may vary within the scope of the appended claims.

I claim:

1. A socket joint for plastic pipes, whereupon a spigot end of one of the pipes to be connected is inserted in an expanded section of a socket, and an intermediate space situated between the spigot end and the expanded section comprises a housing sealing unit that extends along a considerable part of the length of said intermediate space and that comprises several circular flexible lip seals on its outer and inner circumference, wherein the outer and inner circumference of the sealing unit also comprise several circular support seals which have a substantially smaller compressibility especially in the radial direction than the lip seals, and the sealing unit with its seals is one integral piece.

2. A socket joint according to claim 1, wherein both the lip and support seals are situated evenly spaced from one another.

3. A socket joint according to claim 1, wherein the support seals are placed between at least every other lip seal.

4. A socket joint according to claim 1, wherein the lip and support seals provided on the outer circumference of the sealing unit are arranged to substantially match the lip and support seals situated on the inner circumference of the sealing unit.

5. A socket joint according to claim 1, wherein the cross-sectional shape of the support seals is substantially rectangular, whereas the lip seals have a fin-like shape and their cross-section tapers off sharply ending in a sharp tip.

6. A socket joint according to claim 1, wherein the height of the support seals is smaller than that of the lip seals.

7. A socket joint according to claim 1, wherein the cross-sectional surface of the support seals is greater than that of the lip seals.

8. A socket joint according to claim 1, wherein the sealing unit is slightly conical.

9. A socket joint according to claim 1, wherein the hardness of the support seals is greater than that of the lip seals.

10. A socket joint according to claim 1, wherein the support seals and the lip seals are made of different materials.

11. A socket joint according to claim 1, wherein the sealing unit is provided with an end flange that is placed at the outer end of the unit, that blocks the unit, but that can be removed.

12. A socket joint according to claim 1, wherein the sealing unit comprises at its end grip surfaces with which the sealing unit can be easily pulled over the spigot end of the pipe.

13. A socket joint according to claim 1, wherein the end of the sealing unit situated further in the socket comprises a radially inwardly directed annular flange that has an inner diameter corresponding substantially to the inner diameter of the pipe to be joined and that keeps the sealing unit in place at the spigot end of the pipe to be connected during the insertion in the socket.

14. A socket joint according to claim 1, wherein the pipe to be connected is a smooth multilayer pipe comprising, between the inner and outer layer, foamed and recycled material and having an inner diameter that corresponds substantially to the inner diameter of the non-expanded section of the socket.

15. A sealing unit for a socket joint between first and second plastic pipes in which one end of the first pipe is inserted in an expanded end-section socket of the second pipe, the sealing unit comprising:

an elongated tubular body having a radially inner surface for extending about one end of a first pipe and a radially outer surface for extending within and end-section socket of a second pipe when the first and second pipes are arranged for a socket joint;

circular flexible lip seals radially about each of the inner and outer surfaces, the lip seals having a first radial compressibility; and circular support seals radially about each of the inner and outer surfaces, the support seals having a second radial compressibility that is substantially smaller than the first compressibility.

16. The sealing unit according to claim 15, and further comprising end-engaging means on one end of the body and extending radially inward of the inner surface and the lip and support seals thereon for engaging the one end of the first pipe.

* * * * *